(12) United States Patent
Venkatachalam et al.

(10) Patent No.: US 7,953,863 B2
(45) Date of Patent: May 31, 2011

(54) TECHNIQUES FOR TIMING OPTIMIZATION IN WIRELESS NETWORKS THAT UTILIZE A UNIVERSAL SERVICES INTERFACE

(75) Inventors: Muthaiah Venkatachalam, Beaverton, OR (US); Pouya Taaghol, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 912 days.

(21) Appl. No.: 11/745,557

(22) Filed: May 8, 2007

(65) Prior Publication Data

US 2008/0279127 A1    Nov. 13, 2008

(51) Int. Cl.
| | |
|---|---|
| G06F 15/16 | (2006.01) |
| G06F 15/173 | (2006.01) |
| H04L 29/00 | (2006.01) |
| H04W 4/00 | (2009.01) |
| H04W 36/00 | (2009.01) |

(52) U.S. Cl. ........ 709/227; 709/225; 709/231; 709/238; 726/1; 726/2; 726/26; 726/27; 370/410; 370/524; 370/905; 370/338; 370/310; 370/331; 370/216; 370/328; 455/414.1; 455/442; 455/436; 455/439

(58) Field of Classification Search .................. 709/225, 709/227, 231, 238; 370/410, 524, 905, 338, 370/310, 331, 216, 328; 455/414.1, 442, 455/436, 439; 726/1, 2, 26, 27
See application file for complete search history.

(56) References Cited

U.S. PATENT DOCUMENTS

| | | | |
|---|---|---|---|
| 2002/0112186 A1* | 8/2002 | Ford et al. ..................... 713/201 |
| 2005/0273517 A1* | 12/2005 | Patrick et al. ................. 709/238 |
| 2007/0016573 A1* | 1/2007 | Nanavati et al. ................ 707/5 |
| 2007/0038591 A1* | 2/2007 | Haub et al. ....................... 707/1 |
| 2007/0061481 A1* | 3/2007 | Haub et al. ..................... 709/238 |
| 2007/0130343 A1* | 6/2007 | Pardo-Blazquez et al. ... 709/227 |
| 2008/0046457 A1* | 2/2008 | Haub et al. ..................... 707/102 |
| 2008/0081593 A1 | 4/2008 | Moon et al. |
| 2008/0081644 A1 | 4/2008 | Min et al. |
| 2008/0082990 A1 | 4/2008 | Kong et al. |

FOREIGN PATENT DOCUMENTS

WO    2008/140908 A1    11/2008

OTHER PUBLICATIONS

Fujioka, M., et al., "Universal Service Creation and Provision Environment for Intelligent Network", IEEE Communications Magazine, (Jan. 1991).*
Fujioka, M., et al., "Universal Service Creation and Provision Environment for Intelligent Networks", IEEE Communications Magazine (Jan. 1991).*
International Preliminary Report on Patentability received for PCT Patent Application No. PCT/US2008/061213, mailed on Nov. 19, 2009, pp. 2.
International Search Report/Written Opinion for PCT Application No. PCT/US2008/061213, Mailed Aug. 25, 2008, 12 Pages.

* cited by examiner

*Primary Examiner* — Shawki S Ismail
*Assistant Examiner* — Vitali Korobov
(74) *Attorney, Agent, or Firm* — James S. Finn

(57) ABSTRACT

An embodiment of the present invention provides an apparatus, comprising a mobile station (MS) operable to communicate with an application service provider (ASP) in a wireless network, the wireless network including a Universal Services Interface (USI); and wherein the MS includes a USI client adapted to store some or all USI context as required by said ASP and wherein when a user accesses the ASP using something other than a web-browser, the USI client inserts relevant USI context as part of an ASP request message.

9 Claims, 5 Drawing Sheets

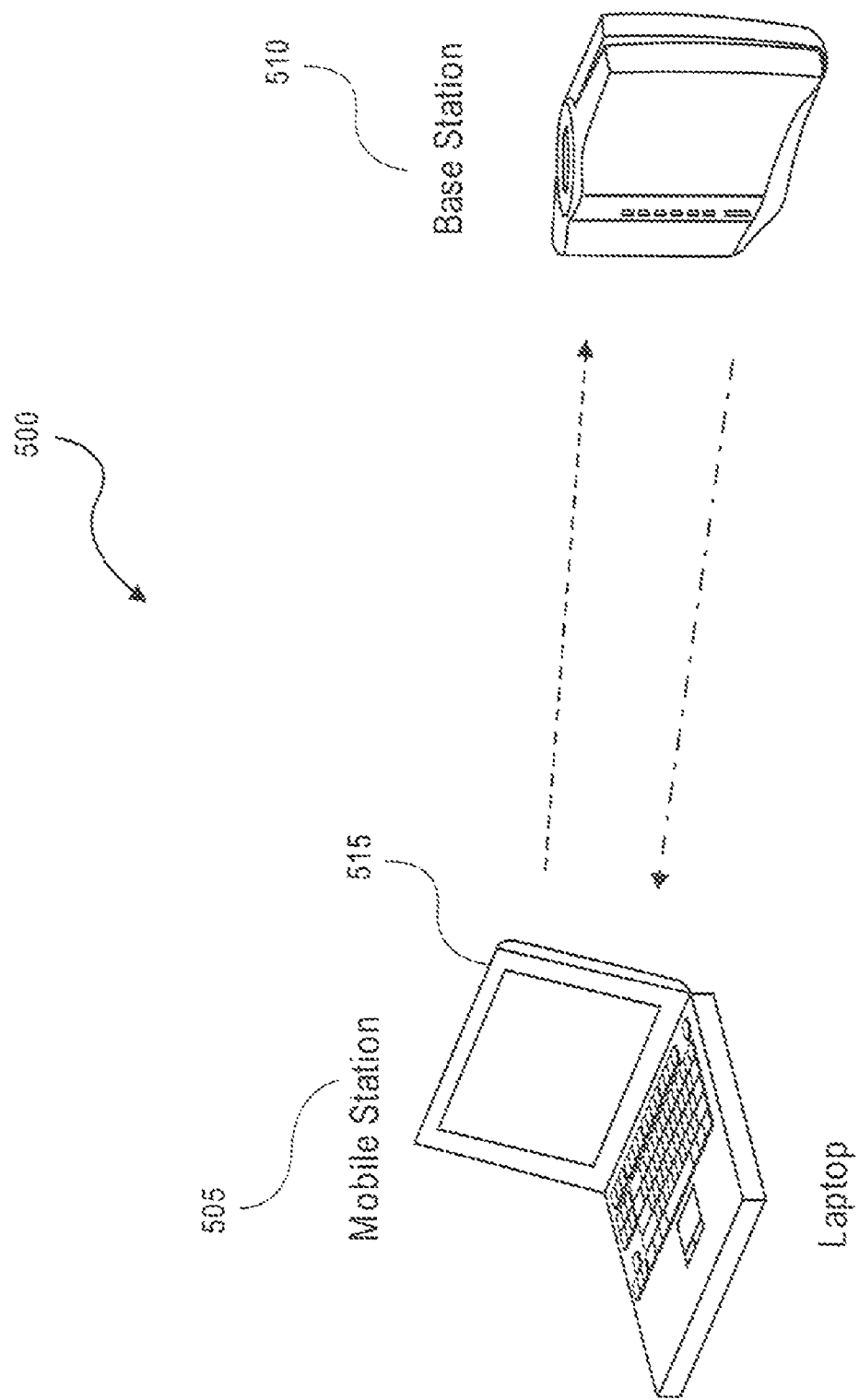

TECHNIQUES FOR TIMING OPTIMIZATION IN WIRELESS NETWORKS THAT UTILIZE A UNIVERSAL SERVICES INTERFACE

BACKGROUND

There is ongoing interest in developing and deploying mobile networks that may facilitate transfer of information at broadband bandwidth and rates. These networks are colloquially referred to herein as broadband wireless access (BWA) networks and may include networks operating in conformance with one or more protocols specified by the 3rd Generation Partnership Project (3GPP) and its derivatives or the Institute for Electrical and Electronic Engineers (IEEE) 802.16 standards (e.g., IEEE 802.16-2005) although the embodiments discussed herein are not necessarily so limited. IEEE 802.16 compliant BWA networks are sometimes referred to as WiMAX networks, an acronym that stands for Worldwide Interoperability for Microwave Access, which is a certification mark for products that pass conformity and interoperability tests for the IEEE 802.16 standards Service providers have been looking for a technology that enables convergence of the service layer, such that value-add services, which can be easily deployed. To fill this gap, the mobile industry (more specifically the 3rd Generation Partnership Project (3GPP)) has created a comprehensive all-IP network named Internet Protocol (IP) Multimedia Subsystem (IMS). The promise of convergence by IMS is being weighed against its complexity both on the network side and the client device side. This has led the industry to question suitability of IMS as a convergence technology of choice.

The deployment and implementation of WiMAX networks, there are ongoing questions on how to best integrate cooperation between service providers (SPs), which are the providers that operate network infrastructure and provide wireless access to subscribers, and Internet Application Service providers (IASPs) (e.g., GOOGLE®, YAHOO®, etc.), which are providers that offer aggregated content on the public Internet Protocol (IP) networks including content providers (CPs) and/or Internet advertisers (IAs).

When the user uses some application other than the regular web-browser to access the internet (for example, the user uses Google\desktop to search the internet instead of firing the browser), the timeline for providing value add service by the ASP based on USI "shrinks". USI may rely on the fact that the ASP can "pre-fetch" the information about the user from the USI server in the WiMAX operator's network, between the time the user goes to Google\.com on his web browser for example and the time he sends the search query; so that by the time the query hits Google\.com, the Google\server can now use the pre-fetched information in formulating the results.

This is however not possible if the user enters the search query without going to Google\.com first; say by means of Google\desktop application on his PC. In such a case, there needs to be a fast way for the Google\server to know the characteristics of the user without having to go to the USI server and fetch this information, in order to provide the same level of valued add service as in the previous case.

Thus, a strong need exists for techniques for timing optimization in wireless networks utilizing a universal services interface.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 5 is system according in accordance with an embodiment of the present invention.

Figure 1:
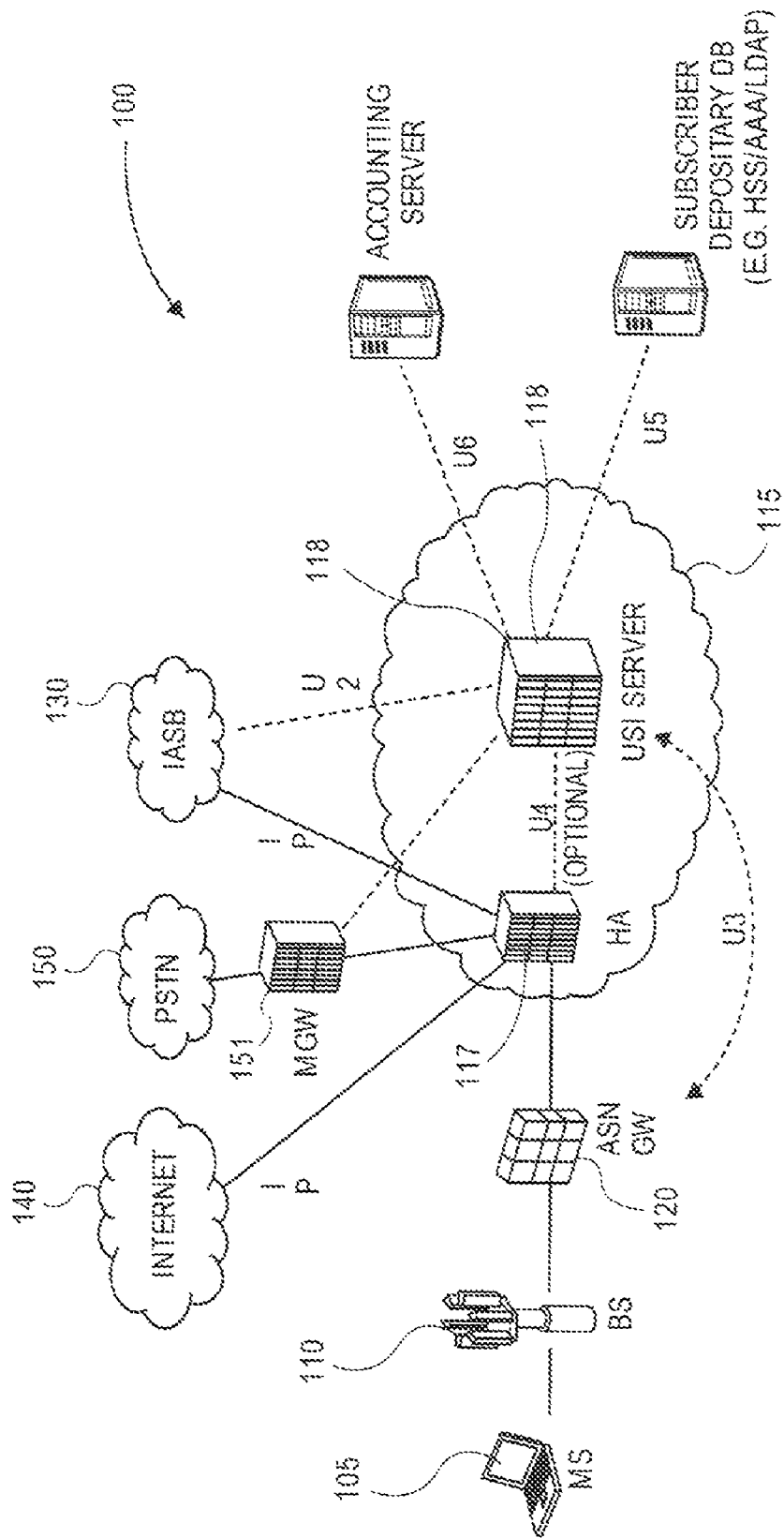
FIG. 1 is functional block diagram of a network architecture according to various inventive embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Embodiments of the invention may be used in a variety of applications. Some embodiments of the invention may be used in conjunction with various devices and systems, for example, a transmitter, a receiver, a transceiver, a transmitter-receiver, a wireless communication station, a wireless communication device, a wireless Access Point (AP), a modem, a wireless modem, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, a network, a wireless network, a Local Area Network (LAN), a Wireless LAN (WLAN), a Metropolitan Area Network (MAN), a Wireless MAN (WMAN), a Wide Area Network (WAN), a Wireless WAN (WWAN), devices and/or networks operating in accordance with existing IEEE 802.11, 802.11a, 802.11b, 802.11e, 802.11g, 802.11h, 802.11i, 802.11n, 802.16, 802.16d, 802.16e standards and/or future versions and/or derivatives and/or Long Term Evolution (LTE) of the above standards, a Personal Area Network (PAN), a Wireless PAN (WPAN), units and/or devices which are part of the above WLAN and/or PAN and/or WPAN networks, one way and/or two-way radio communication systems, cellular radio-telephone communication systems, a cellular telephone, a wireless telephone, a Personal Communication Systems (PCS) device, a PDA device which incorporates a wireless communication device, a Multiple Input Multiple Output (MIMO) transceiver or device, a Single Input Multiple Output (SIMO) transceiver or device, a Multiple Input Single Output (MISO) transceiver or device, a Multi Receiver Chain (MRC) transceiver or device, a transceiver or device having "smart antenna" technology or multiple antenna technology, or the like. Some embodiments of the invention may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), Extended GPRS, Code-Division Multiple Access (CDMA), Wideband CDMA (WCDMA), CDMA 2000, Multi-Carrier Modulation (MDM), Discrete Multi-Tone (DMT), Bluetooth (®), ZigBee (™), or the like. Embodiments of the invention may be used in various other apparatuses, devices, systems and/or networks.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

There are two general models which are generally known to provide integration between SPs and IASPs including: (i) the old cellular or "walled garden" model in which content is provided entirely through SP's control environments; and (ii) the open model in which content is provided by IASP transparently via the SP.

The walled garden model had advantages for the SP in that it had full control on content accessed by the user. However the limited content typically provided by the SPs was incomparable with those of Internet, and thus failed to attract widespread user interest.

The open model is attractive to users because it may provide nearly unlimited content. However, because the SP is transparent to transactions in this model, there is no revenue opportunity for the SP beyond access usage. Furthermore, because mobile station location is not known by the IASPs, without some input from SPs, there are limits on enhanced services which may be provided.

A recent model of content solutions for wireless broadband networks is defined in which improved content may be provided by IASPs with the SP's assistance. This model is referred to herein as the universal services interface (USI) model or Internet+ model. The USI model proposed herein is beneficial to users, IASPs and SPs in that users may obtain a wider variety of content than previously available, SPs can benefit from additional revenue sharing, and IASPs can offer better, more convenient, and/or smarter services to users.

Turning to FIG. 1, an example network architecture 100 for implementing the USI model is shown. According to one exemplary implementation, a mobile station (MS) 105, for example subscriber stations using protocols compatible with the IEEE 802.16 standards (e.g., IEEE 802.16-2005 Amendment), may communicate via an over-the-air (OTA) interface with a base station (BS) 110 to connect with a connectivity service network (CSN) 115 operated by a service provider.

In certain example implementations, communications between subscribers via BS 110 to CSN 115 may be facilitated via one or more access service network gateways (ASNGW) 120 although the inventive embodiments are not limited to this specific type of network implementation. ASNGW 120 (or other similar type of network node) acts as an interface between core network 115 and a plurality of base stations 110 and may function as a type of BS controller and/or mobile switching center (MSC) to facilitate handover control and other functions for a radio access network (RAN), although the embodiments are not so limited.

Connectivity service network (CSN) 115, in certain example embodiments, may include a home agent (HA) 117 (or similar type of network node) and a new type of network node referred to herein as a USI Server 118 which acts as a gateway for the interaction with the application service provider (IASP) 130 such as GOOGLE\®, etc. Home agent 117 may serve as a seamless Internet Protocol (IP) traffic hub to connect mobile stations (e.g., MS 105) with other non-service provider networks or entities such as a public Internet network 140, a public switched telephone network (PSTN) 150 and/or IASP 130. In actuality, IASP 130 may be part of Internet network 140 but is shown separately in FIG. 1 to highlight various interactions with the service provider's CSN 115. If desired, a media gateway (MGW) node 151 may be used to convert circuit-switched communications to IP communications or vice versa between home agent 117 and PSTN 150 although the inventive embodiments are not limited in this respect.

According to certain embodiments, an accounting server 160 and/or subscriber depository database 170 may also be included in network 100. Accounting server 160 may be coupled with service provider's CSN 115 to authenticate/track user subscriptions (e.g., to track user charges) while database 170 may be used to store customer profiles and/or personal data and preferences of subscribers (e.g., to identify users and authorized services). In certain embodiments, server 160 and database 170 may be combine in a single node. To this end, the description and illustration of network 100 represents logical entities and thus arrangements of certain entities could be combined with others or separated from one another according to network design preference and/or physical constraints.

According to the example network architecture in FIG. 1, the key logical interfaces for network 100 are as follows:

-U2 interface: between the IASP 130 and the USI server 118;

-U3 interface; between the ASN 120 and the USI server 118; and

-U4 interface; an optional interface between HA 117 and the USI server 118.

USI Server 118 may also have interfaces U6 to accounting server 160 and U5 to subscriber depository DB 170 for content charging records and/or service authorization and user privilege.

According to certain inventive embodiments the U2 interface between IASP 130 and USI server 118 may be used primarily for user identification (e.g., user of mobile station 105) as well as any other interaction described herein between the service provider network and the IASP 130.

The U3 interface between USI server 118 and ASNGW 120 is a signaling and hotlining interface which in certain embodiments may support functions for location services, presence, provisioning, etc.

Location services: upon the association of MS 105 with a new serving gateway (SGW) (e.g., anchor paging controller (APC) or ASN-GW 120), either via inter-ASN handover or anchor PC relocation, the new SGW handshakes with USI server 118 via U3 to inform the change in the SGW for MS 105. When accurate location of MS 105 is requested by a content provider (e.g., IASP 130), USI 118 may contact the SGW to begin location measurements.

Presence: when MS 105 performs network entry/exit or idle mode entry/exit, in a particular ASN-GW, the GW handshakes with USI server 118 via U3 to convey presence (or lack thereof) information.

Provisioning: if USI server 118 also functions as a provisioning server, U3 can be used for signaling of provisioning operations (e.g., Provisioning start, Provisioning complete, etc.). Additionally, MS 105 can be hot-lined to USI server 118 via U3 until provisioning is complete.

In certain embodiments, an optional U4 interface may be used for quality-of-service (QoS) signaling between home agent 117 and USI 118 for managed QoS services like IP television (IPTV). In other embodiments, U4 is omitted and the foregoing signaling may be conveyed directly to ASN-GW 120 via the U3 interface.

Figure 2:
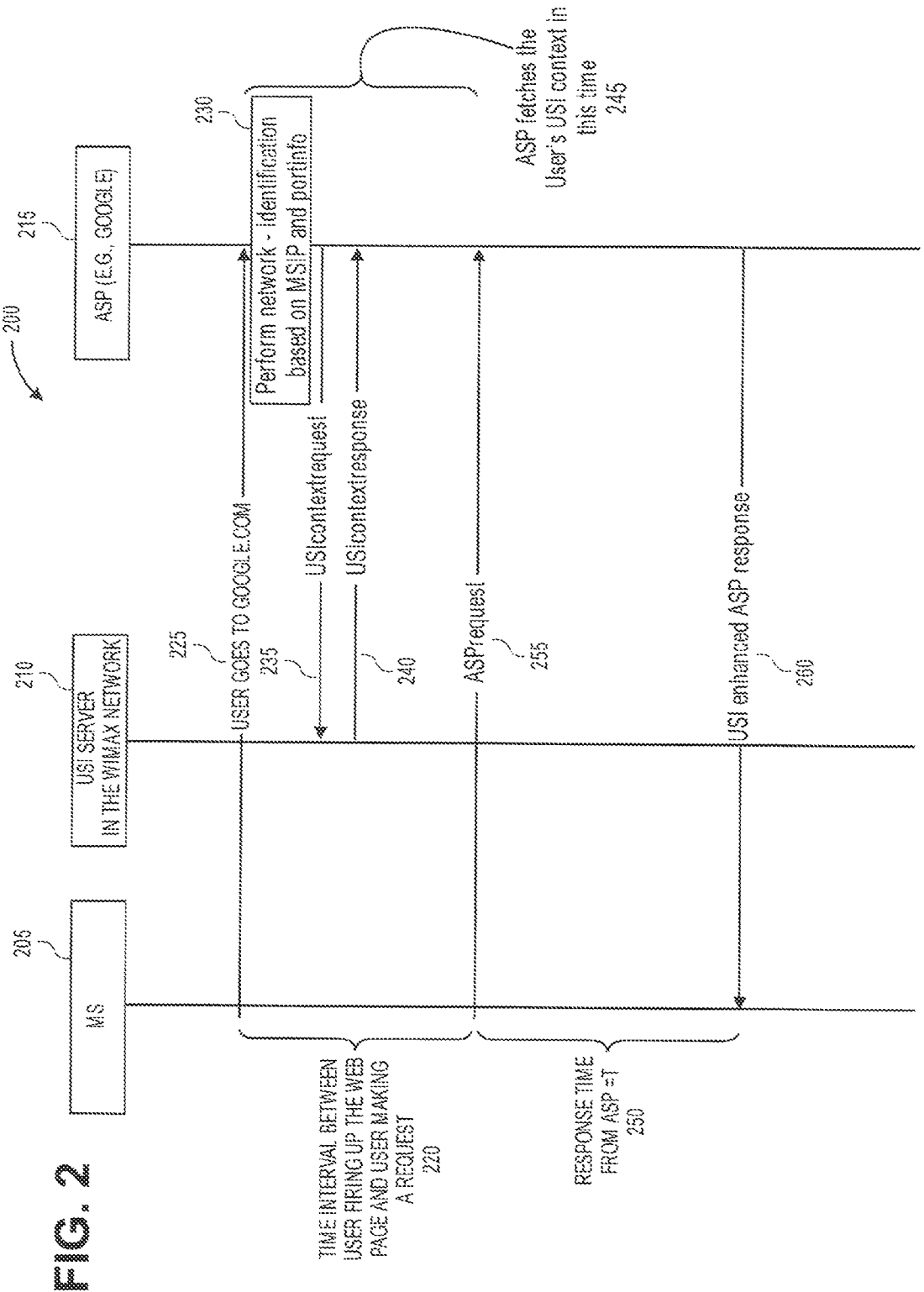
FIG. 2 illustrates basic USI timing assuming user accesses the ASP from a web-browser.

Embodiments of the present invention provide extensions to the USI concept that addresses timing issues. As shown in FIG. 2, generally at 200, when a mobile station (MS) 205 user uses an application other than the regular web-browser to access the Internet (for example, the user uses Google\desktop to search the internet instead the browser), the timeline for providing value add service by the ASP based on USI "shrinks".

Prior to embodiments of the present invention, a user of a MS 205 may go via google.com 225 to ASP 215. ASP 215 then sends USI context request 235 and USI context response 240 back to USI server 210. USI server 210 then sends USI context response to ASP at 240. At 255 MS 205 sends ASP request 255 to ASP 215 with USI enhanced ASP response 260 from ASP 215 back to MS 205. 250 depicts the response time from ASP=T and 220 illustrates time interval between aUser firing up the web page and the user making a request.

Thus, USI basically relies on the fact that the ASP 215 can "pre-fetch" the information 245 about the user from the USI server 210 in the WiMAX operator's network, between the time the user goes to google.com 225 on his web browser for example, and the time he sends the search query; so that by the time the query hits google.com, the Google\server 225 can now use the pre-fetched information in formulating the results. 230 depicts performing network identification based on MS IP and port info. It is understood that google.com is merely one illustrative example and the present invention is not limited to any particular ASP.

This is however not possible if the user enters the search query without going to google.com first, say by means of Google\desktop application on his PC. In such a case, there needs to be a fast way for the Google\server to know the characteristics of the user without having to go to the USI server and fetch this information, in order to provide the same level of valued add service as in the previous case.

Figure 3:
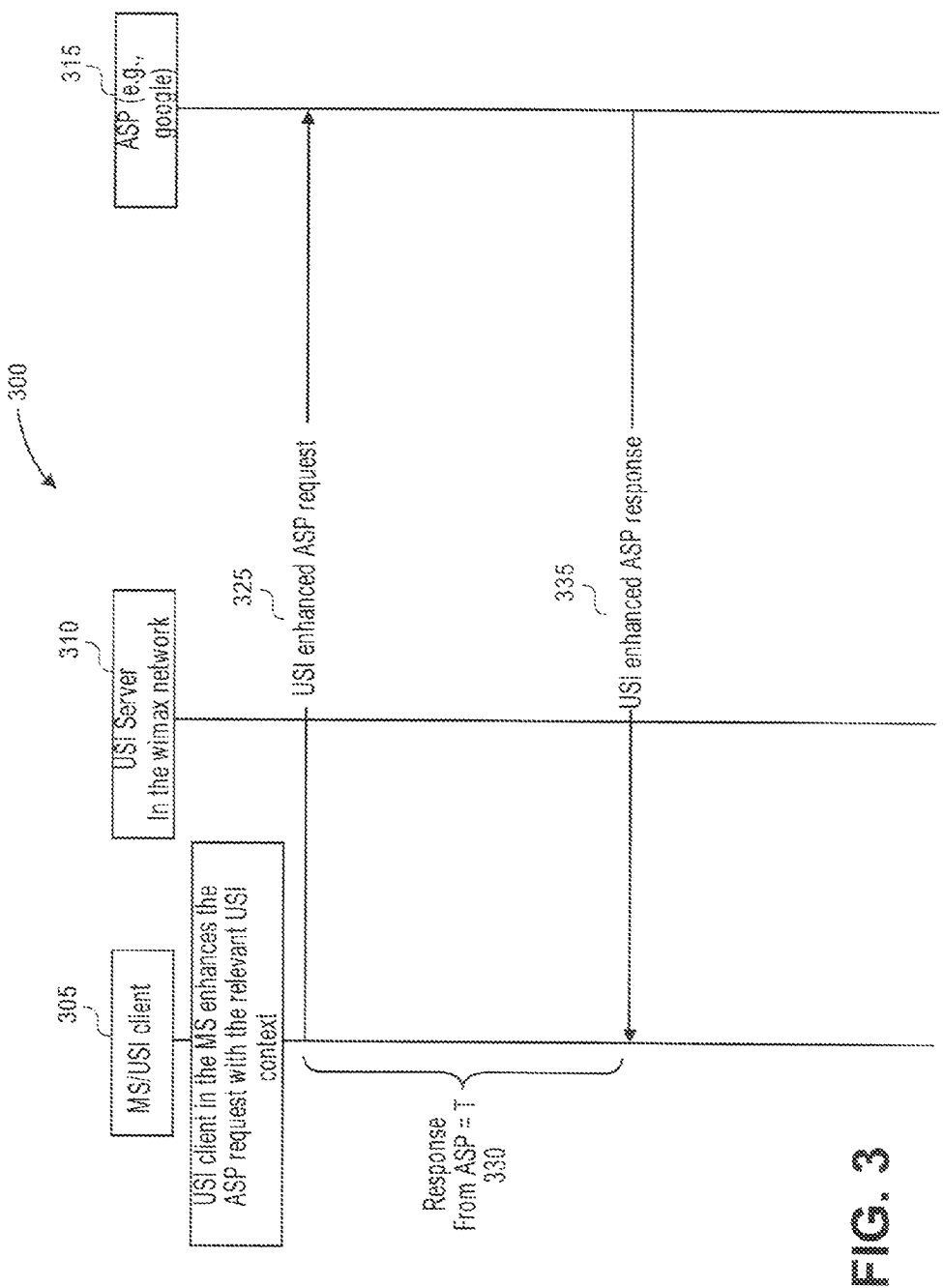
FIG. 3 illustrates a USI client solution for timing optimization in the scenario that the user accesses the ASP from a non-browser ASP specialized application in accordance with an embodiment of the invention.

An embodiment of the present invention addresses the timing issue set forth above. As set forth in FIG. 3, generally at 300, is a solution with a USI client in the user device such as mobile station 305. The USI client for example may be bundled with an ASP application like Google\desktop 315, although the present invention is not limited in this respect. The USI client basically:

a) Stores some or all of USI context as required by the ASP 315. For example the device could store its current location information, service information, device information, QoS information etc.

b) Monitors the IP addresses on the user device. In the event that the user enters a VPN, it caches the external IP address of the VPN tunnel.

When the user accesses the ASP 315 using something other than a web-browser, the USI client 305 inserts the relevant USI context as part of the ASP request message 325. This way the ASP 315 now has the USI enhanced request 325 from the user and can provide a USI enhanced response 335 back to the user and does not have to spend extra time on fetching the USI context from the USI server 310. 330 shows the response time from ASP=T.

Figure 4:
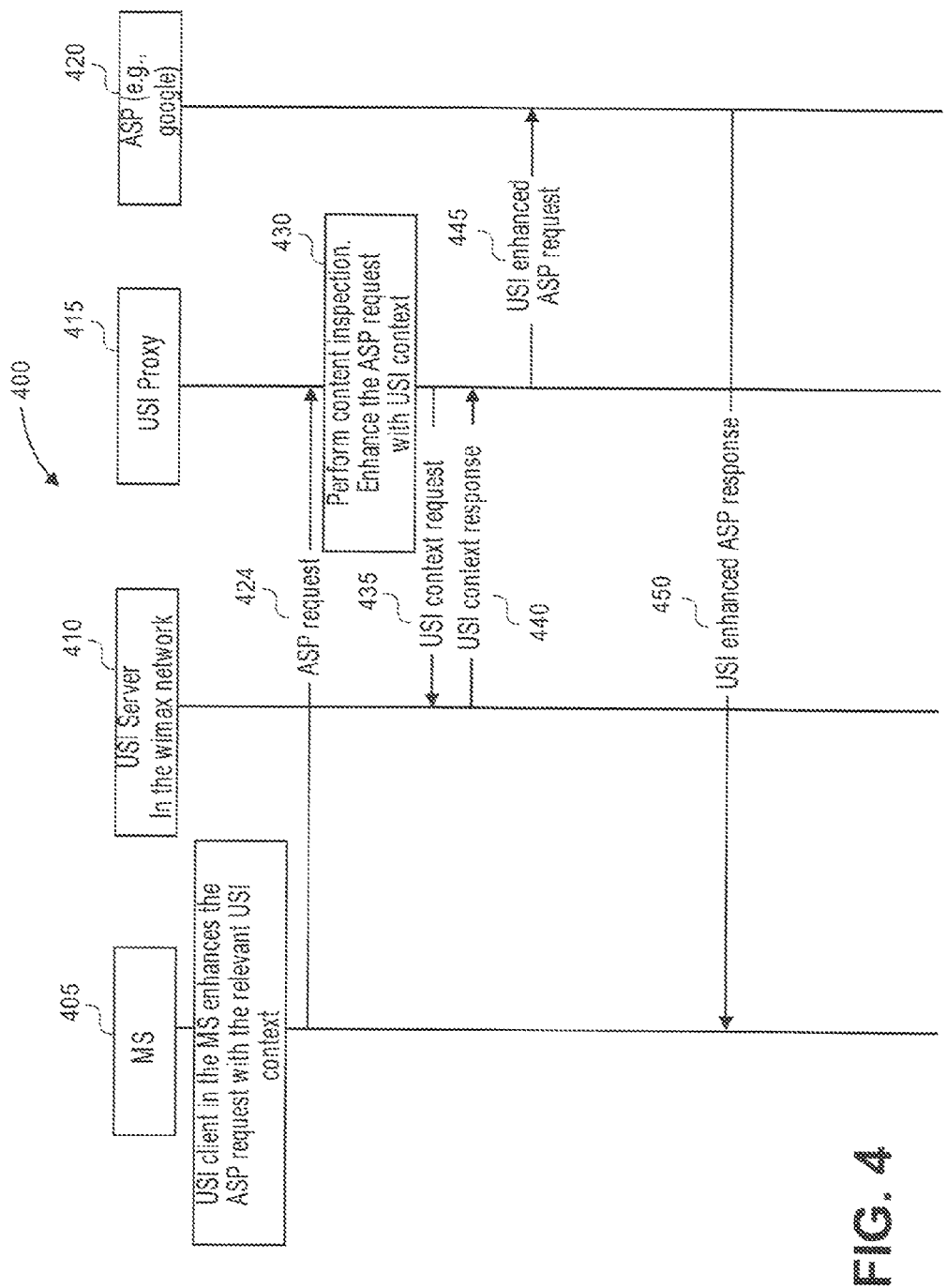
FIG. 4 shows a USI proxy solution for timing optimization in the scenario that the user accesses the ASP from a non-browser ASP specialized application in accordance with an embodiment of the invention

Turning now to FIG. 4 at 400 is an illustration of a USI proxy in the network. In this scenario, a USI proxy 415 may be in the network instead of or in addition to the USI client in the device, such as mobile station 405. The USI proxy 415 in the network may or may not be collocated with the USI server 410. The USI proxy 415 is in the line of the data path from the user to the ASP 420 and performs stateful content inspection 430 of all the packets passing through it. When the USI proxy 415 intercepts an ASP request 425 message on HTTP/XML, it basically appends the USI context to this message if not already present in the message; in order to fetch the USI context of the MS, the USI proxy sends the USI context request 435 to USI server 410; the USI server sends USI context response 440 back to USI proxy 415 which contains the USI context for the MS. This way, the ASP now has the USI enhanced request 445 and does not have to spend extra time on fetching the USI context from the USI server and may send USI enhanced ASP response 450 to MS 405.

Some embodiments of the invention may be implemented by software, by hardware, or by any combination of software and/or hardware as may be suitable for specific applications or in accordance with specific design requirements. Embodiments of the invention may include units and/or sub-units, which may be separate of each other or combined together, in whole or in part, and may be implemented using specific, multi-purpose or general processors or controllers, or devices as are known in the art. Some embodiments of the invention may include buffers, registers, stacks, storage units and/or memory units, for temporary or long-term storage of data or in order to facilitate the operation of a specific embodiment.

Some embodiments of the invention may be implemented, for example, using a machine-readable medium or article which may store an instruction or a set of instructions that, if executed by a machine, for example, by system 500 of FIG. 5, by mobile station 505 of FIG. 5 which may include a processor (not shown) and antenna 515, or by other suitable machines, cause the machine to perform a method and/or operations in accordance with embodiments of the invention. Mobile station 505 may be in communication with base station 310. Such machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Re-Writeable (CD-RW), optical disk, magnetic media, various types of Digital Versatile Disks (DVDs), a tape, a cassette, or the like. The instructions may include any suitable type of code, for example, source code, compiled code, interpreted code, executable code, static code, dynamic code, or the like, and may be implemented using any suitable high-level, low-level, object-oriented, visual, compiled and/or interpreted programming language, e.g., C, C++, Java, BASIC, Pascal, Fortran, Cobol, assembly language, machine code, or the like.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
a mobile station (MS) operable to communicate with an application service provider (ASP) in a wireless network, said wireless network including a Universal Services Interface (USI); and
wherein said MS includes a USI client adapted to store some or all USI context as required by said ASP and wherein when a user accesses said ASP using something other than a web-browser, said USI client inserts relevant USI context as part of an ASP request message and in order to fetch said USI context of said MS, a USI proxy sends said USI context request to a USI server and said USI server sends a USI context response back to said USI proxy which contains said USI context for said MS.

2. The apparatus of claim 1, wherein said ASP request is bundled by using XML.

3. The apparatus of claim 1, wherein said USI context comprises said MS's current location information and/or quality of service (QoS).

4. A method, comprising:
communicating with an application service provider (ASP) in a wireless network by a mobile station (MS), said wireless network including a Universal Services Interface (USI); and
including in said MS a USI client adapted to store some or all USI context as required by said ASP and wherein when a user accesses said ASP using something other than a web-browser, said USI client inserts relevant USI context as part of an ASP request message and in order to fetch said USI context of said MS, a USI proxy sends said USI context request to a USI server and said USI server sends a USI context response back to said USI proxy which contains said USI context for said MS.

5. The method of claim 4, further comprising bundling said ASP request by using XML.

6. The method of claim 4, wherein said USI context comprises said MS's current location information and/or quality of service (QoS).

7. A machine-accessible non-transitory medium that provides instructions, which when accessed, cause a machine to perform operations comprising:
communicating with an application service provider (ASP) in a wireless network by a mobile station (MS), said wireless network including a Universal Services Interface (USI); and
including in said MS a USI client adapted to store some or all USI context as required by said ASP and wherein when a user accesses said ASP using something other than a web-browser, said USI client inserts relevant USI context as part of an ASP request message and in order to fetch said USI context of said MS, a USI proxy sends said USI context request to a USI server and said USI server sends a USI context response back to said USI proxy which contains said USI context for said MS.

8. The machine-accessible medium of claim 7, further comprising said instructions causing said machine to perform operations further comprising bundling said ASP request by using XML.

9. The machine-accessible medium of claim 7, wherein said USI context comprises said MS's current location information and/or quality of service (QoS).

* * * * *